United States Patent [19]

Picker

[11] 4,436,621

[45] Mar. 13, 1984

[54] PRESSURE VESSEL HAVING A PLURALITY OF FILTERING ELEMENTS

[75] Inventor: Charles W. Picker, West Bloomfield, Mich.

[73] Assignee: Oakland Products, Inc., Pontiac, Mich.

[21] Appl. No.: 406,188

[22] Filed: Aug. 9, 1982

[51] Int. Cl.³ .................. B01D 29/26; B01D 35/16
[52] U.S. Cl. ........................... 210/232; 210/323.2; 210/479; 55/378
[58] Field of Search ............... 210/232, 323.2, 452, 210/453, 459, 479, 451, 477, 315; 55/378, 493, 508; 422/101, 104; 292/256.6; 49/56

[56] References Cited

U.S. PATENT DOCUMENTS

| | | |
|---|---|---|
| 1,619,118 | 3/1927 | Guy et al. |
| 2,693,882 | 11/1954 | Olson et al. ............. 210/323.2 |
| 3,319,793 | 5/1967 | Miller, Jr. et al. ............. 210/243 |
| 3,503,516 | 3/1970 | Harms et al. ............. 210/323 |
| 3,830,043 | 8/1974 | Nielsen et al. ............. 55/378 |
| 4,022,693 | 5/1977 | Morgan, Jr. ............. 210/345 |
| 4,282,098 | 8/1981 | Morgan, Jr. ............. 210/232 |
| 4,322,293 | 3/1982 | Morgan, Jr. ............. 210/232 |

Primary Examiner—Charles N. Hart
Assistant Examiner—John W. Czaja
Attorney, Agent, or Firm—Basile, Weintraub & Hanlon

[57] ABSTRACT

A pressure vessel has a container shaped housing with a top wall provided with a plurality of filter receiving openings. A bag-shaped filter element is fitted into each housing top wall opening and is retained within the top wall housing by a hold-down ring having one of its ends pivotally secured to the top wall to permit the ring to be moved between a first position overlaying a portion of each filter to retain the filters in position within their respective top wall openings and a second position wherein the ring is pivoted upwardly from the housing top wall to permit the removal of each filter bag. A cover encloses the pressure vessel at the top wall section and the interior of the cover forms a flow path between an inlet and the filter bags such that liquid to be filtered passes from the inlet downwardly through the filter bags and into the interior of the housing beneath the top wall and is exhausted through a liquid outlet provided in the housing.

3 Claims, 4 Drawing Figures

PRESSURE VESSEL HAVING A PLURALITY OF FILTERING ELEMENTS

BACKGROUND OF THE INVENTION

I. Field of the Invention

The present invention relates to pressure vessels and, in particular, to a pressure vessel having a plurality of filter bags mounted therein for filtering liquid material.

II. Description of the Prior Art

The prior art is replete with examples of filtering devices and means for retaining a filtering device within a secured position until removal of the same is desired. An example of pressure vessels having a plurality of filtering elements secured therein is disclosed in U.S. Pat. No. 3,503,516 issued on Mar. 31, 1970. This patent discloses a pressure vessel having a top wall provided with a plurality of openings through which are fitted a plurality of filtering elements. The individual filtering elements are secured to the top wall by a plate member that overlays each of the filtering elements and through which a plurality of fasteners extend into engagement with the top wall. In use it is necessary to remove these filtering elements, and the pressure vessel disclosed in the above-listed patent requires the time-consuming and necessarily difficult task of removing each of the fasteners so as to first remove the overlying plate in order to gain access to each of the individual filtering elements for their removal.

This difficulty is overcome by a number of methods. One example of a method employed for overcoming the difficulty encountered in the U.S. Pat. No. 3,503,516 design is disclosed in U.S. Pat. No. 4,022,693. This patent suggests the use of a cover that has an offset portion that spans the housing top wall, with the offset portion therein being spaced above each of the filtering elements to provide a flow path communicating an inlet to each of the filtering elements. The cover in the '693 patent has a peripheral lower face portion that overlays a section of each filtering element so as to retain the filtering elements in position when the cover is closed. Removal of the cover permits immediate access to the filtering elements and their removal.

A second example of a pressure vessel which overcomes the aforementioned problem is that disclosed in U.S. Pat. No. 1,619,118. This patent discloses a vessel similar to the vessel disclosed in the '693 patent in that the cover when removed from its closed position permits immediate access to the filtering elements carried therein.

In both of the above-mentioned examples, there is a necessity to have both a sealing engagement between the cover and the housing and a sealing engagement between the filtering element and the top wall surface which is supporting the filtering element, otherwise fluid will leak past the filtering element in an unfiltered condition. This problem is compounded in the '693 vessel by the fact that both seals are obtained by engagement of the housing cover with the housing wall and the filtering element. This requires rather high-quality engineering tolerances which greatly increase the cost of manufacturing such equipment, which normally must be made and marketed at a relatively low price in order to be competitive. Thus, the ease of obtaining and removing the filtering elements as described in the two aforementioned patents so as to overcome the problems in the '516 vessel creates a new problem in obtaining a proper seal which, if not proper, can greatly damage the article on which the filtered fluid may be used. For example, it is common to use pressure vessels of this type for filtering paints used in the manufacture of automobiles. If unfiltered paints are sprayed on an automobile, an improper coating will result, necessitating repainting of the automobile.

An example of how the problems with this seal arrangement may be overcome is disclosed in the Miller U.S. Pat. No. 3,319,793. This patent utilizes a plurality of springs to hold filtering elements in place. While this achieves the desired result of having immediate accessibility to the filtering elements, it requires the manufacture of specialized filters; and their use in a market which is highly competitive is not at all advantageous.

SUMMARY OF THE INVENTION

The present invention, which will be described subsequently in greater detail, comprises a pressure vessel having a side wall and a top wall including a plurality of filter bag receiving openings within which a plurality of filter bags are disposed. The top wall includes one or more concentrically disposed rings which are pivoted relative to the top wall and movable between a first position overlaying a portion of each filter bag to retain the filter bags within their respective openings and a second position wherein the ring may be raised to an elevated position to permit the removal of one or all of the filter bags from within their respective openings. A removable cover overlays the top wall and encloses the interior of the housing.

It is therefore an object of the present invention to provide a pressure vessel having a plurality of filter bags which are held in pace by a simple mechanism that permit a proper seal between the filter bags and their respective receptacles and which also permits the filter cover to engage the filter housing in a sealing engagement without concern for strict engineering tolerances.

It is a further object of the present invention to provide a pressure vessel having a plurality of filter bags which may be simply and quickly removed from the filter.

It is another object of the present invention to provide a pressure filter which is of efficient operation, of easy design and simple to maintain.

It is yet another object of the present invention to provide a pressure vessel of a unique arrangement for mounting a plurality of filter bags.

Other objects, advantages and applications of the present invention will become apparent to those skilled in the art of pressure vessels when the accompanying description of several examples of the best modes contemplated for practicing the invention is read in conjunction with the accompanying drawings.

BRIEF DESCRIPTION OF THE DRAWINGS

The specification herein makes reference to the accompanying drawings wherein like reference numerals refer to like parts throughout the several views, and wherein.

DESCRIPTION OF THE PREFERRED EMBODIMENTS

Figure 1:
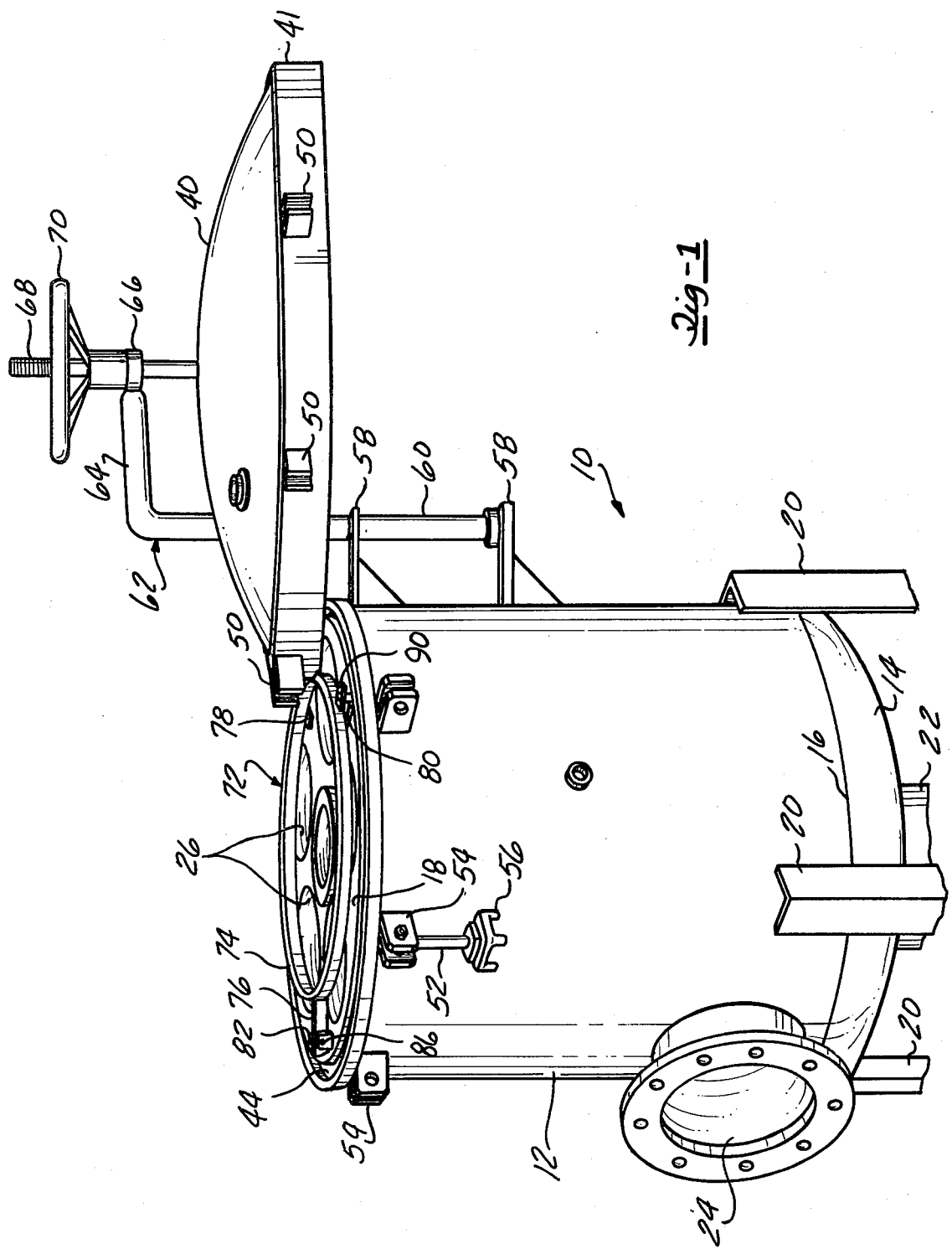
FIG. 1 is a perspective view of one example of a pressure vessel constructed in accordance with the principles of the present invention.
Figure 2:
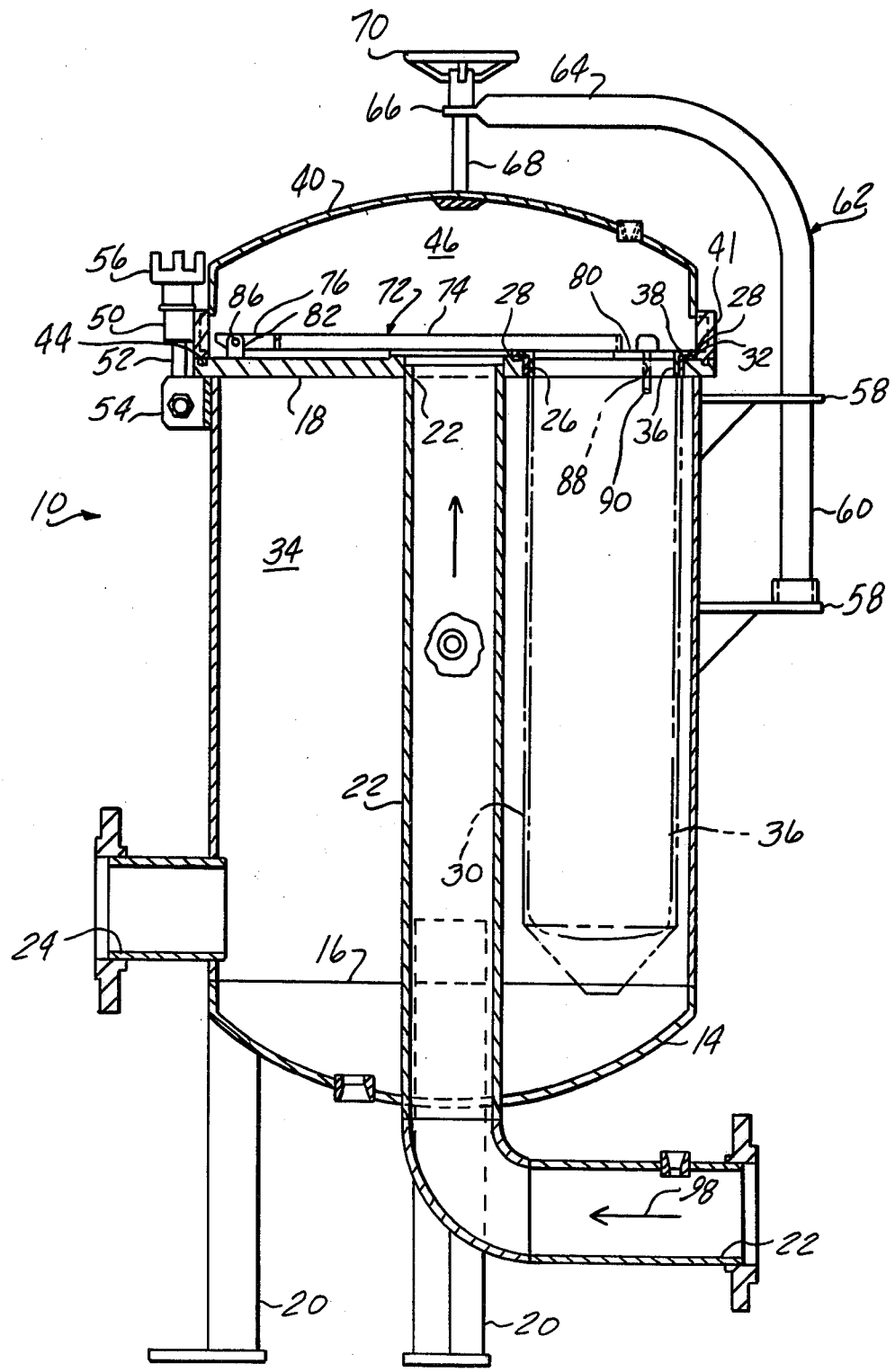
FIG. 2 is a longitudinal sectional view of the pressure vessel ilustrated in FIG. 1 with the cover in a sealed position.
Figure 3:
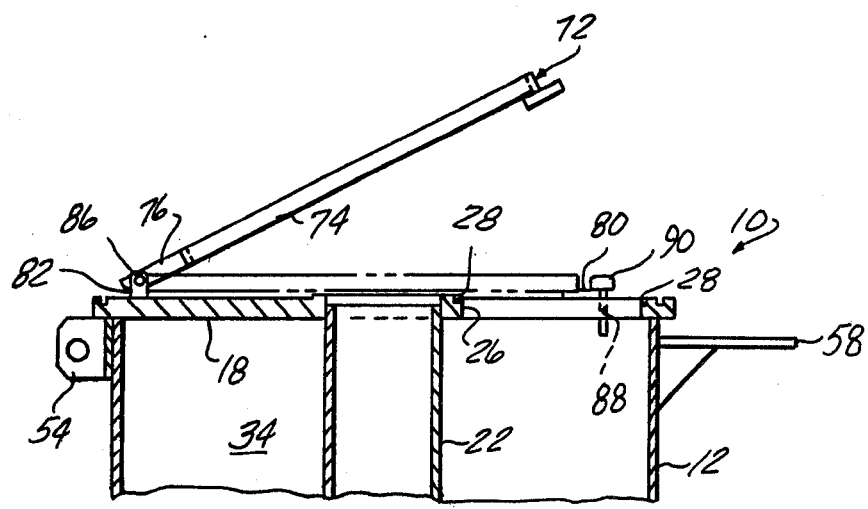
FIG. 3 is a view similar to FIG. 2 with the cover removed and the filter bag retaining ring in a raised position to permit the access to and removal of the filter bags from the pressure vessel.

Referring now to the drawings and, in particular, to FIGS. 1-3 wherein there is illustrated one example of the best mode contemplated for practicing the invention in the form of a pressure vessel 10. The pressure vessel 10 comprises a cylindrical housing 12 having a bottom wall 14 attached to the lower peripheral surface of the cylindrical housing 12 by any suitable means, such as by welding at joint 16. The cylindrical housing 12 has a top wall 18 which is secured to the top surface of the cylindrical housing 12 by suitable welding means.

Feet in the form of a plurality of vertically disposed legs 20 are connected to the bottom of the cylindrical housing 12 for the purpose of supporting the pressure vessel 10 in an upright position on the floor, ground or other type of foundation during use.

A fluid conduit 22 serves as an inlet for the pressure vessel 10 and, as can best be seen in FIG. 2, projects upwardly through the bottom wall 14 and terminates at its upper open end in the top wall 18 of the cylindrical housing 12. The fluid conduit 22 extends through the bottom wall 14 of the cylindrical housing 12 in coaxial alignment with the longitudinal axis of the cylindrical housing 12 and is suitably sealed, such as by welding, where the fluid conduit 22 passes through the bottom wall 14 and where it joins the housing top wall 18 to prevent liquid leakage around the conduit 22 at these locations. A second fluid conduit 24 is connected to the cylindrical housing 12 at the side wall thereof and forms a fluid outlet for the pressure vessel 10.

The top wall 18 of the cylindrical housing 10 has a plurality of openings 26 formed therein. As can best be seen in FIG. 1, the pressure vessel 10 in this illustrated embodiment is provided with five openings which are equally angularly spaced apart and equally radially spaced from the longitudinal axis of the cylindrical housing 12. It should be noted that more or less than five openings may be provided in pressure vessels and at different angular and radial spacings from the longitudinal axis, for example, as shown in the pressure vessel 100 illustrated in FIG. 4.

Each opening 26 is defined by a shoulder 28 (FIG. 2) formed in the top wall 18 and is adapted to receive a metal strainer 30. The strainer 30 is formed of a stainless steel screen and has an upper flange 32 which is seated in the shoulder 28, while the elongated portion of the strainer 30 extends through the opening 26 downwardly into the lower interior chamber 34 of the cylindrical housing 12. Each strainer in turn receives a filter element 36 which is bag-shaped, preferably made of a suitable filtering cloth. The filter element or bag 36 has an open top formed by a ring part 38 (FIG. 1) which is received by the top portion of the strainer flange 32. The ring part 38 of the filter element 36 may include an O-ring upon which pressure may be exerted to provide a sufficient seal between the filter bag 36 and the metal strainer flange 32 to prevent fluid from passing therebetween when the same is subjected to fluid pressure. The manner in which the filter bags 36 are retained within their respective openings 26 will be described in greater detail hereinafter.

The pressure vessel 10 has a cover 40 which is domed shaped and spans the top wall 18 of the cylindrical housing 12. The cover 40 has a vertical peripheral section 41, the lower portion of which is adapted to overlay in sealing engagement an O-ring which is fitted in an angular groove 44 formed along the outer periphery of the cylindrical housing top wall 18. It should be noted that the angular groove 44 and its associated O-ring are outwardly radially spaced from the openings 26; and when the cover 40 is clamped into a closed position as shown in FIG. 2, a fluid seal is provided at the juncture between the cover 40 and the cylindrical housing top wall 18 such that the interior of the cover 40 defines an upper interior chamber 46 whereby fluid exiting from the inlet fluid conduit 22 flows through the upper interior chamber 46 and is communicated to the upper open ends of each of the filter bags 36 for fluid filtering therethrough, as will be described hereinafter.

The angular peripheral section 41 of the cover 40 has a plurality of spaced fingers 50 that are adapted to receive a plurality of fastening bolts 52. The bolts 52, in turn, are carried on the peripheral edge of the cylindrical housing 12 adjacent the peripheral edge of the top wall 18 by means of suitable fingers 54. The fingers 54 are of such a design as to permit the bolts 52 to rotate from the lowered position illustrated in FIG. 1 to the raised position shown in FIG. 2. In the raised position a nut 56 carried at the top of the bolt 52 can be tightened to exert a compressive force on the cover 40 which sealingly engages the O-ring in groove 44 to provide the suitable aforementioned seal between the cover 40 and the cylindrical housing 12. While only one bolt 52 is illustrated, the present embodiment uses six bolts 52 which are equally angularly spaced and equally radially located from the longitudinal axis of the cylindrical housing 12.

The exterior wall of the cylindrical housing 12 is provided with a pair of support arms 58 which pivotally support one leg 60 of a cover support member 62, while the horizontal leg 64 thereof terminates in a hollow boss 66. The top central portion of the cover 40 has fixedly attached thereto a vertically extending threaded member 68 which extends through the hollow boss 66 into threaded engagement with a handle 70. It can thus be seen that when the removal of the cover 40 is desired, the various fastening bolts 52 are removed from the cover fingers 50 and the handle 70 is rotated so as to raise the cover 40 upwardly away from the top wall 18 a sufficient distance to permit the cover support member 62 to be rotated which, in turn, carries the cover 40 away from the top wall 18 as shown in FIG. 1. When the cover 40 is removed, access to and removal of the filter bags 36 may be had for replacement and/or cleaning.

As can best be seen in FIGS. 1 and 2, the top wall 18 of the cylindrical housing 12 is provided with a hold-down member 72 in the form of a ring 74 that has a pivotal finger 76 and a pair of angularly spaced clamping fingers 78 and 80. The top wall 18 has a vertical support member 82 with a horizontal threaded bore adapted to receive a threaded member 86. The threaded member 86 extends through an aperture in the end of the pivotal finger 76 to pivotally secure the hold-down member 72 to the top wall 18 to permit the hold-down member 72 to be moved between the position illustrated in FIG. 1 where it is disposed in a horizontal position to an elevated position where it clears the filter bags 36, as shown in FIG. 3. Pivotal movement of the hold-down member 72 is about the axis of the threaded member 86. The top wall 18 is also provided with a pair of threaded apertures 88 (only one of which is shown) which receive clamping members 90. The clamping members 90 threadingly engage their respective apertures 80 until they firmly abut the clamping fingers 78 and 80 to securely clamp the hold-down member 72 in the position shown in FIGS. 1 and 2. In this position the hold-down member 72 exerts a clamping force against each of the underlying filter bags 36 as the hold-down member 72 overlays a portion of each bag 36. When the clamping members 90 are unthreaded a sufficient distance from the top wall 18 to disengage the clamping fingers 78 and 80, the hold-down member 72 may be raised to its second position which is a point high enough to permit free access to the filter bags 36. The hold-down member 72 may be pivoted 180° with respect to the position shown in FIG. 1 and therefore be completely free of the filter bags 36 to facilitate the removal and replacement of the same. The underside of each clamping member 90 may be flattened so as to prevent the removal of the clamping members from their respective apertures 88 so as to prevent the loss of these clamping members during their constant use.

In operation, as shown in FIG. 2 by the arrow 98, liquid enters the pressure vessel 10 by the fluid conduit 22 and flows upwardly in the conduit 22 through the cylindrical housing 12 where it is discharged above the top wall 18 within the upper interior chamber 46 defined by the cover 40. The liquid then flows downwardly through the open top in each filter bag 36, through the walls of the filter bags 36 in a filtering relationship in a known and conventional manner into the lower interior chamber 34 of the cylindrical housing 12 and is exhausted through the fluid conduit 24. When it is desired to clean or replace one or more of the filter bags 36, the fastening nuts 56 are loosened a sufficient amount so as to permit the fastening bolts 52 to be removed from engagement with the housing fingers 50 and rotated to the lowered, released position illustrated in FIG. 1. The cover handle 70 is rotated to elevate the cover 40 a sufficient distance so that the lower peripheral edge thereof will clear both the outer peripheral edge of the top wall 18 and the hold-down member 72, permitting the cover 40 to be swung outwardly away from the top wall 18, as illustrated in FIG. 1. The clamping members 90 are then rotated with respect to the clamping fingers 78 and 80 to clear the same, thereby permitting their hold-down member 72 to be pivoted with respect to the support member 82 to the raised position as shown in FIG. 3. The filter bags 36 can be lifted from their respective strainers 30 and either cleaned, repaired or replaced in preparation for the next filtering operation. When the appropriate number of filter bags 36 have been replaced within their respective strainers 30, the hold-down member 72 is then pivoted to its original, lowered position as illustrated in FIG. 1, and the clamping members 90 are rotated to clampingly engage the clamping fingers 78 and 80, thereby securing the hold-down member 72 into engagement with a portion of each of the filter bags. The cover 40 is then repositioned above the top wall 18, lowered by means of the handle 70 and secured in place by means of the fastening bolts 52, as described hereinbefore.

Figure 4:
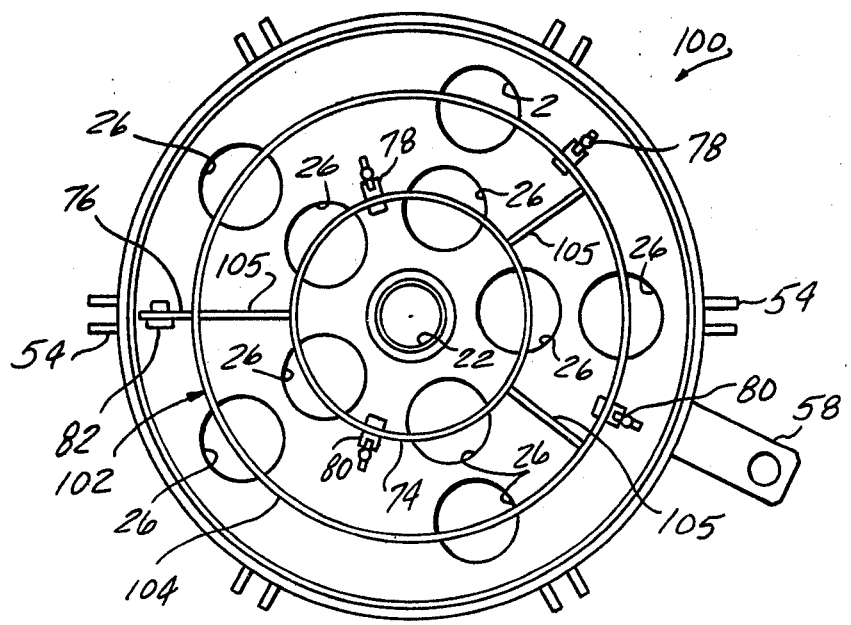
FIG. 4 is a plan view of a second example of the present invention with the cover removed for clarity.

Referring now to FIG. 4 wherein there is disclosed another example of a preferred embodiment of the present invention in the form of the pressure vessel 100. The pressure vessel 100 is identical in nearly every aspect as the pressure vessel 10 hereinbefore described except for those features which will be described hereinafter and which are numbered separately. Common elements between the two pressure vessels 10 and 100 are referred to by the same numerals.

FIG. 4 is a plan view of the pressure vessel 100 with its cover 40 removed. It should be noted that the difference between the pressure vessels 10 and 100 is the number of openings 26. In the pressure vessel 100, ten openings are provided, the inner five openings being disposed about the same diameter, while a second group of five openings are disposed radially outward and about the same diameter with respect to one another. A hold-down member 102 is similar to the hold-down member 72 in that it has an inner ring 74 which engages and retains the innermost filter bags 36 in their respective openings 26, while a second concentric and radially outwardly spaced ring 104 is provided for engaging the outermost bags 36 to retain them in place. Suitable connecting arms 105 are provided for connecting the rings 74 and 104 so that the two rings 74 and 104 move as a single unit from a lowered to a raised position in the same manner as described hereinbefore with respect to the hold-down member 72. A plurality of clamping members 90 engage clamping fingers 78 and 80 on both the inner and outer rings 74 and 104 to secure them in position in the same manner as hereinbefore described. Operation of the pressure vessel 100 is identical in all aspects as that described with respect to the pressure vessel 10.

While two examples of the preferred embodiments of the present invention have been disclosed, it should be understood by those skilled in the art of such pressure vessels that other forms of the present invention may be had, all coming within the spirit of the present invention and the scope of the appended claims.

What is claimed is as follows:

1. In a filter of the type comprising:
    a housing having side and bottom walls and a top wall spaced from said bottom wall, said housing having a liquid outlet, sid housing top wall having at least two spaced openings formed therein;
    removable, bag-shaped filtering means for straining a liquid having an open upper end fitted into each top wall opening, each filtering means being supported by said top wall at its open end and projecting into the interior of said housing below said top wall;
    a removable cover enclosing said filter housing, the interior of said cover defining a flow passage communicating with each filtering means open end; and
    a liquid inlet in communication with said interior of said cover, the improvement comprising:
    hold-down means pivotally carried by said housing top wall and movable between a first lowered position wherein said hold-down means overlays a portion of each filtering means to retain said filtering means within said housing top wall openings and a second raised position subsequent to the removal of said cover from said housing wherein said hold-down means is pivoted with respect to said housing top wall to a position spaced from said filtering means to effect removal of said filtering means; the hold-down means including:
    a ring member pivotally mounted to said top wall such that said ring member may be pivoted with respect to said top wall from said first lowered position to said second raised position, said ring member overlaying said filtering means when in said second lowered position; and clamping means secured to said top wall for clamping a portion of said ring member to said top wall at a point angularly spaced from the point of pivotable movement for said ring member when said ring member is in said second lowered position.

2. The filter defined in claim 1 wherein said openings are spaced at least outwardly radially with respect to each other and said hold-down means comprises at least two concentric ring members, a first ring member overlaying said filtering means carried in the first of said openings, a second outer concentric ring overlaying the filtering means in the second of said openings.

3. The filtering device defined in claim 2 further comprising clamping means carried by said top wall for engaging and retaining said hold-down ring members in said second lowered position.

* * * * *